United States Patent [19]

Housel

[11] 4,340,514

[45] Jul. 20, 1982

[54] NON-TOXIC LIQUID STABILIZER FOR HALOGENATED HYDROCARBON RESINS AND PROCESS FOR STABILIZING SUCH RESINS

[75] Inventor: David S. Housel, Flemington, N.J.

[73] Assignee: Interstab Chemicals Inc., New Brunswick, N.J.

[21] Appl. No.: 278,340

[22] Filed: Jun. 29, 1981

[51] Int. Cl.³ .................. C08L 93/00; C09F 1/04; C09K 15/32

[52] U.S. Cl. .................. 524/77; 106/219; 106/220; 106/221; 106/222; 106/227; 106/236; 106/239; 260/105; 252/400 R; 252/400 A; 524/147; 524/151; 524/153; 524/273; 524/274; 524/139; 524/109; 524/569; 523/100

[58] Field of Search ............... 260/27 R, 23 XA, 105, 260/23 EP; 206/219, 220, 221, 222, 227, 236, 239; 252/400 R, 400 A

[56] References Cited

U.S. PATENT DOCUMENTS

| | | | |
|---|---|---|---|
| 2,150,506 | 3/1939 | Kelly | 260/105 |
| 2,157,767 | 5/1939 | Long | 260/105 |
| 2,776,895 | 1/1957 | Biser | 106/239 |
| 3,321,425 | 5/1967 | Blarr et al. | 260/105 |
| 3,398,108 | 8/1968 | Turner | 260/105 |
| 3,912,709 | 10/1975 | Gould | 260/105 |

Primary Examiner—H. S. Cockeram
Attorney, Agent, or Firm—Francis W. Young; Robert F. Green

[57] ABSTRACT

A non-toxic liquid stabilizer comprising, (a) from about 5 to about 35 percent of zinc resinate, (b) from about 5 to about 35 percent of calcium resinate, (c) from about 10 to about 40 percent of non-toxic plasticizer, (d) from about 1 to about 10 percent of a non-toxic antioxidant, and (e) from about 25 to about 75 percent of a non-toxic phosphite, said stabilizer containing from about 0.1 to about 3.5 percent zinc, and from about 0.025 to about 2.28 percent calcium, all weights being based upon the total weight of the stabilizer, is disclosed. Also disclosed is a similar stabilizer which does not contain phosphite and contains from about 25 to about 90 percent of the plasticizer. A method for stabilizing halogenated hydrocarbon resins utilizing the stabilizers of the present invention is also disclosed.

10 Claims, No Drawings

NON-TOXIC LIQUID STABILIZER FOR HALOGENATED HYDROCARBON RESINS AND PROCESS FOR STABILIZING SUCH RESINS

BACKGROUND OF INVENTION

This invention relates to a non-toxic liquid stabilizer useful for stabilizing halogenated hydrocarbon resins and to a process for stabilizing halogenated hydrocarbon resins. More particularly, this invention relates to a stabilizer which is both liquid and non-toxic.

Liquid stabilizers are known in the art, as shown by Canadian Pat. No. 735,997. Stabilized halogenated hydrocarbon resins are also well known and one may refer to, for example, Canadian Pat. No. 650,532 and British Pat. No. 1,072,663.

A need has existed for an easily processable liquid stabilizer system useful in halogenated hydrocarbon resins, such as polyvinylchloride, which could be used to stabilize such resins yet not introduce any contaminating agents which would prevent the use of the stabilized resins in applications wherein the resin would come into contact with food, skin, or blood.

SUMMARY OF THE INVENTION

A non-toxic liquid stabilizer has now been discovered which comprises (a) from about 5 to about 35 percent of zinc resinate, (b) from about 5 to about 35 percent of calcium resinate, (c) from about 10 to about 40 percent of a non-toxic plasticizer, (d) from about 1 to about 10 percent of a non-toxic antioxidant, and (e) from about 25 to about 75 percent of a non-toxic phosphite. The stabilizer contains from about 0.1 to about 3.5 percent zinc and from about 0.025 to about 2.28 calcium, all weights being based upon the total weight of the stabilizer.

There has also been discovered a non-toxic liquid stabilizer which comprises (a) from about 5 to about 35 percent of zinc resinate, (b) from about 5 to about 35 percent of calcium resinate, (c) from about 25 to about 90 percent of a non-toxic plasticizer, and (d) from about 1 to about 10 percent of a non-toxic antioxidant. The stabilizer contains from about 0.1 to about 3.5 percent zinc and from about 0.025 to about 2.28 percent calcium, all weights being based upon the total weight of the stabilizer.

A method for stabilizing a halogenated hydrocarbon resin has also been discovered. The method comprises incorporated into said resin a non-toxic liquid stabilizer comprising (a) from about 5 to about 35 percent of zinc resinate, (b) from about 5 to about 35 percent calcium resinate, (c) from about 10 to about 40 percent of a non-toxic plasticizer, (d) from about 1 to about 10 percent of a non-toxic antioxidant, and (e) from about 25 to about 75 percent of a non-toxic phosphite. The stabilizer contains from about 0.1 to about 3.5 percent zinc and from about 0.025 to about 2.28 percent calcium, all weights being based upon the total weight of the stabilizer. The stabilizer is incorporated in a stabilizing amount from about 0.25 to about 4.0 percent by weight, based upon the weight of the resin.

There has also been discovered a method for stabilizing a phosphite-containing hydrocarbon resin composition comprising incorporating into said resin composition a non-toxic liquid stabilizer comprising (a) from about 5 to about 35 percent of zinc resinate, (b) from abut 5 to about 35 percent of calcium resinate, (c) from about 20 to about 89 percent of a non-toxic plasticizer, and (d) from about 1 to about 10 percent of a non-toxic antioxidant. The stabilizer contains from about 0.1 to about 3.5 percent zinc and from about 0.025 to about 2.28 percent calcium, all weights being based upon the total weight of the stabilizer. The stabilizer is incorporated in a stabilizing amount from about 0.25 to about 4.0 weight percent based on the weight of the resin.

DETAILED DESCRIPTION OF THE PREFERRED EMBODIMENTS

As used herein, the term "non-toxic" is meant to describe a composition which when utilized in the recited amounts is generally recognized as being safe to place into contact with food, skin, or blood.

The zinc resinate of the present invention is a reaction product of a zinc compound such as zinc oxide, or zinc hydroxide with a naturally occurring terpene hydrocarbon mono-carboxylic acid, typically modified or unmodified rosin acids such as tall oil rosin, pine stump rosin, wood rosin, gum rosin, either neat or heat treated or partially hydrogenated, polymerized etc., and typically comprised of abietic acid, dehydroabietic acid, pimaric acid, levopimaric acid, neo-abietic acid, isopimaric, dihydroabietic acid, palustric acid and tetrahydroabietic acid. Commercially available rosin acids, also known as, resin acids, may contain from about 2 to about 4 percent of tall oil fatty acids and from about 10 to about 13 percent nonacidic (neutral) components, few of which have been chemically identified. Zinc chloride may also be reacted with the sodium or potassium salt or soap of the aforementioned rosin acids.

Typical zinc resinates acceptable for use in the products of this invention include those commercially available from Reichhold Chemicals, Inc., under the trademarks Zinar, Zitro, Zirex, Zinros and Nirez, and from Continental Turpentine Co., under the trademark Conrez. The zinc content of the zinc resinate may vary from as little as about 2% to a typical maximum of about 10%.

The calcium resinate component of the present invention is a reaction product of a calcium compound, such as calcium oxide or calcium hydroxide, with a rosin acid as defined above for zinc resinates. Calcium resinates acceptable for use in the products of this invention are, typically, those commercially available from Reichhold Chemicals, Inc., under the trademark Zinar, Zitro, Zirex, Zinros, Nirez and Helix, and from Continental Turpentine Co., under the trademark Conrez. The calcium resinates useful in this invention may contain as little as about 0.5 Wt. percent calcium, up to as much as about 6.5 Wt. percent calcium, as metal.

It should be noted that the calcium and zinc resinates for use in compositions of this invention may be prepared as neat zinc resinates, neat calcium resinates or mixtures (co-precipitated or otherwise prepared) of calcium and zinc resinates.

The plasticizers of this invention include di-2-ethylhexyladipate(dioctyladipate); di-2-ethylhexylphthalate (dioctylphthalate); dicyclohexylphthalate; diisononyladipate; diisononylphthlate; n-butyl benzyl phthalate; 1,3-butylene glycol/adipic acid polyester (1700–2200 MW) containing 16 Wt. percent terminal myristic, palmitic and stearic acid ester functionality; di($C_7$, $C_9$-alkyl) adipate, the $C_7$, $C_9$ alkyl residues being derived from oxo-process alcohols, di-n-alkyl adipate, derived from $C_6$-$C_8$-$C_{10}$ synthetic fatty alcohols; di-n-hexylazelate; di-hexylphthalate; diphenylphthalate; epoxidized butyl esters of linseed oil fatty acids; epoxidized linseed oil; epoxidized soya oil; white mineral oil; and propylene glycol adipate (3000 average molecular weight).

Additional plasticizers which are not considered non-toxic may be used to make stabilizers of this invention for use in other than non-toxic applications. Examples of plasticizers of this type are shown below but are in no way meant to limit the scope of the present invention: methylabietate, cumylphenylacetate, dibutoxyethyladipate, di-n-hexylazelate, glyceryltribenzoate, tri-n-butylcitrate, dioctylfumarate, triisononyltrimellitate, dioctylisophthalate, butyloleate, chlorinated paraffin, tricresylphosphate, dibutylsebacate, and dioctylterephthalate.

The antioxidants which comprise a necessary part of this invention include butylated hydroxy anisole (BHA); butylated hydroxy toluene (BHT); propyl gallate; 2,4,5-tri-hydroxybutyrophenone; dilaurylthiodipropionate; distearylthiodipropionate; gum guaiac; nor-dihydroguairetic acid and thiodipropionic acid.

Additional antioxidants which are not considered non-toxic may be used to make stabiilizers of this invention for use in other than non-toxic applications. Examples of antioxidants of this type are shown below but are in no way meant to limit the scope of the present invention: 2,2'-ethylidene-bis(4,6-di-t-butylphenol); 2-t-butylphenol; 2,6-di-t-butylphenol; 4-t-butyl-o-cresol; 6-t-butyl-o-cresol; 2,6-dimethylphenol; 2,2'-methylenebis(4-methyl-6-t-butylphenol); 2,2'-methylenebis(2,6-di-t-butylphenol); catechol; t-butylcatecol; resorcinol; hydroquinone; 4,4'-thiobis(6-t-butyl-o-cresol).

The phosphite which plays a key role in this invention is preferably blended into the stabilizer compositions but can also be incorporated into the halogenated resin compound separately. The preferred phosphite is trisnonylphenyl phosphite [tri(mixed mono- and di-nonylphenyl)phosphite]. These phosphites useful in the present invention may have the general formulae:

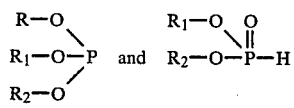

wherein R$_2$ and R$_1$ are each selected from the group consisting of aryl, alkyl, cycloalkyl, arkaryl, aralkyl, alkoxy-aryl, alkoxy-alkyl, aryloxy alkyl and alkoxy cycloalkyl radicals containing at least 5 carbon atoms and mono OH substituted variants of foregoing, R is selected from the group consisting of hydrogen and R$_1$ and R$_2$ radicals. The neutral or tri-substituted phosphites are preferred. While this broad class of organic phosphites shows effectiveness for the purposes of the present invention, it has been found that those organic phosphites which are characterized by the presence of an aryl nucleus having a carbon atom thereof indirectly attached to the phosphorus atom through an oxygen atom are particularly effective, and especially the tri-(alkyl-aryl)phosphites. Reaction products of chemically equivalent amounts of phenol sulphides with PCl$_3$ may also be used.

Specific illustrative examples of the class of organic phosphites contemplated for use in accordance herewith are as follows:

tri-iso-amyl phosphite
tri-phenyl phosphite
tri-cresyl phosphite
tri-benzyl phosphite
tri-naphthyl phosphite
tri-(p-ethylphenyl) phosphite
tri-(o-iso-propylphenyl) phosphite
tri-(p-tert.-butylphenyl) phosphite
tri-(p-tert.-amylphenyl) phosphite
tri-(p-cyclohexylphenyl) phosphite
tri-(p-2-ethylhexylphenyl) phosphite
tri-(p-n-octylphenyl) phosphite
tri-(p-1,1,3,3-tetramethylbutylphenyl) phosphite
di-(phenyl)-mono-isooctyl phosphite
tri-(p-nonylphenyl) phosphite
tri-(p-laurylphenyl) phosphite
tri-(p-methoxyphenyl) phosphite
tri-hexyl phosphite
tri-cyclohexyl phosphite
tri-methylcyclohexyl phosphite
tri-2-ethylhexyl phosphite
tri-capryl phosphite
tri-decyl phosphite
tri-dodecyl phosphite
tri-(phenyl-ethyl) phosphite
tri-(phenyl-hexyl) phosphite
tri-(phenyl-n-octyl) phosphite
tri-(methyl phenyl-hexyl) phosphite
tri-(ethoxy-n-butyl) phosphite
tri-(p-hydroxy phenyl iso-propylidene phenyl) phosphite
mono-phenyl-di-dodecyl phosphite
mono-phenyl-di-capryl phosphite
di-phenyl phosphite
di-cresyl phosphite
di-capryl phosphite
di-cyclohexyl phosphite
di-lauryl phosphite
di-(tert.-butylphenyl) phosphite
di-methoxyphenyl phosphite
di-phenyl phosphite
phenyl-di-isodecyl phosphite
distearylpentaerythritol diphosphite From the foregoing specific examples, those skilled in the art will obtain sufficient information to enable them to arrive at tri- or di-substituted organic phosphites other than those specifically mentioned which will be found useful in accordance with the present invention. In general, so long as the phosphite contains at least 5 carbon atoms in each organic substituent radical and there are at least 2 substituent radicals, compatibility and boiling point of the phosphite are sufficient for the purposes of the present invention. The useful phosphites may be made by reacting PCl$_3$ with a hydroxy compound in the ratio of 1 mole PCl$_3$ to 2 or more moles of —OH in a mono or polyhydric alcohol or phenol. Substituent groups other than those specifically illustrated in the foregoing listing of specific examples, may be present, although it is desired that no color be imparted by this particular additive since it is the desired objective to maintain the color as nearly constant as possible in these vinyl chloride-containing compositions. Hydroxy substituents in the alkyl, aryl, or cycloalkyl radicals may be tolerated so long as compatability can be maintained. The presence of ether, thioether, or ester groups in the alkyl or aryl substituents likewise does not seem to interfere with the operability of these compounds. In the preferred compositions, it is the presence of trivalent phosphorus which is of importance, more so than the nature of the organic radical to which the phosphorus is indirectly attached through oxygen.

The term halogenated hydrocarbon resin may be any one or more of the thermoplastics homopolymers derived from vinyl chloride, vinyl bromide, vinyl fluoride or vinylidene chloride and/or their copolymers with comonomers, such as, ethylene, propylene, butylene, vinyl acetate, vinyl alcohol, vinyl ethers, methacrylates, styrene, etc. Also, copolymerized vinyl chloride/vinylidene chloride resins are useful in the practice of the present invention.

In general, the non-toxic stabilizers of this invention can vary in composition as indicated below:

| Non-Toxic Stabilizer Components | Ingredient Range (Wt. %) |
| --- | --- |
| Zinc Resinate | about 5 to about 35 |
| Calcium Resinate | about 5 to about 35 |
| Plasticizer | about 10 to about 40 |
| Antioxidant | about 1 to about 10 |
| Phosphite | about 25 to about 75 |

Where it is desirable to leave out the phosphite from a stabilizer blend of this invention, in order to add said phosphite directly to the resin compound, the above formula composition would be adjusted to 100 Wt. percent through the use of additional plasticizer. A typical formulation would thus contain about 20 to about 89 percent of a plasticizer and no phosphite, the percentages for the remaining constituents being the same as indicated above.

Based on the above range of ingredients, the stabilizers of the present invention may contain from about 0.1 to about 3.5 Wt. percent zinc, from about 0.025 to about 2.28 Wt. percent calcium and from about 0.93 to about 10.28 Wt. percent phosphorus, the preferred elemental compositions being about 0.5 to about 3.5 Wt. percent zinc and about 0.1 to about 1.5 Wt. percent calcium.

The stabilized resins of the present invention show improved clarity in comparison to the products made from state-of-the-art pastes and solids and the storage stability of the stabilizers of the present invention are far superior to pastes, which tend to exhibit solid/liquid phase separation, and solids, which tend to settle or stratify into layered solid components according to their individual densities. Paste or solid stabilizers of the prior art do not allow plastic product fabricators flexibility in formulating their systems and thus they must use phosphite chelators in addition to the paste or solid stabilizer. The use of the stabilizer products of the present invention offers fabricators the option of either separate phosphite addition or using a one-package phosphite-containing stabilizer. Furthermore, the preferred liquid stabilizer products of this invention are readily miscible, in all proportions, with a great majority of plasticizers, whereas, solid and paste stabilizers are not.

The stabilizers of this invention are specifically aimed at non-toxic applications. As such, they may be used in conjunction with any other available non-toxic product, such as, di-n-octyltin maleate, di-n-octyltin bis(isooctylthioglycolate), butylthiostannoic anhydride (monobutyltin sulfide) and calcium/zinc pastes and solids. The use of stabilizers of the present invention in conjunction with other non-toxic products, such as the aforementioned, is within the scope of the present invention.

While the main objective of the present invention is to provide non-toxic stabilization to halogenated hydrocarbon resins, such as poly-(vinyl chloride), it is not intended to be limited to this application area. Thus, for other than non-toxic applications, the stabilizers of this invention can be used in conjunction with virtually any of the great number of stabilizers, as desired, such as calcium and zinc carboxylates, barium carboxylates and phenates (stoichiometric or overbased, i.e. basic), cadmium carboxylates, strontium carboxylates (stoichiometric or overbased), stannous carboxylates, lead salts, such as sulphates, phosphites, stearates, phthalates, etc., nitrogen based products, such as aminocrotonate esters, alphaphenyl-indole, etc., antimony carboxylates or mercaptides or mercaptoesters, organotin compounds, such as, methyl-, or butyl-, or octyl-, or ester-tin derivatives of carboxylic acids, mercaptans, sulfides, combinations, thereof, etc., or any combination of these.

If used as the sole stabilizer, the products of this invention may be employed at, typically, from about 1.0 to about 4.0 parts per hundred. They may be used at levels of from 0.25 to 2.0 parts per hundred, when employed in conjunction with other stabilizer compositions.

The following non-limiting examples further illustrate the present invention.

EXAMPLE 1

In a 1000 ml beaker, 100 g of Conrez 200 Pale Calcium Resinate/Zinc Resinate Blend (Continental Turpentine Co.) was added to a solution of 4 g butylated hydroxy anisole in 100 g of di-2-ethylhexylphthalate at 150° C. and stirred for 45 minutes to dissolve. The blend was then cooled to 95° C., 196 g of tris(nonylphenyl)phosphite was stirred in and the resultant product filtered to give a clear amber liquid containing 0.36% calcium, 1.54% zinc and 2.21% phosphorous.

EXAMPLE 2

In a 500 ml beaker, 135 g tris(nonylphenyl)phosphite and 75 g butylbenzylphthalate are mixed and heated to 145° C. 30 g each of propyl gallate, zinc resinate (Zirex) and calcium resinate (Helix) are added and dissolved in 45 minutes to give a dark amber liquid which when filtered is crystal clear and contains 0.89% zinc, 0.29% calcium, and 2.03% phosphorous.

EXAMPLE 3

100 g tris(nonylphenyl)phosphite and 35 g of dioctylazelate are heated to 150° C. and 30 g zinc resinate, 20 g calcium resinate and 15 g butylated hydroxytoluene are added and allowed to dissolve during one-half (½) hour. On cooling, the unfiltered product contains 1.34% zinc, 0.29% calcium and 2.25% phosphorous.

EXAMPLE 4

15 g of butylated hydroxytoluene are dissolved in 75 g of dioctyladipate by heating in a beaker to 155° C. 45 g zinc resinate and 37.5 g calcium resinate are added and allowed to dissolve during one (1) hour of stirring at 155° C. The mixture is cooled to 95° C. and 127.5 g of tris(nonylphenyl)phosphite are stirred in. The resulting product contains 1.34% zinc, 0.36% calcium and 1.91% phosphorous.

The examples (number 5 through 11) which follow, show the stabilization efficacy of a product of this invention in a typical plastisol formulation (unpigmented) applicable to production of gloves, toys, bottle cap liners (enclosure liners), vinyl wall covering, table cloths, etc., in comparison to state-of-the-art calcium/zinc liquids, solids, paste and a barium/cadmium product. It should be noted that the comparison solid and paste calcium/zinc stabilizers are non-toxic but the first listed calcium/zinc carboxylate liquid is not non-toxic and is used commercially only for stabilizing resins used in applications such as enclosure liners. The second calcium/zinc liquid product is also not non-toxic. The barium/cadmium stabilizer is included to demonstrate the effectiveness of a product of this invention in comparison to a typically used product for other than non-toxic applications.

| Plastisol Formulation | |
|---|---|
| Ingredients | Parts by Weight |
| Geon 121 (BF Goodrich) | 100.0 |
| Dioctylphthalate | 90.0 |
| Epoxidized Soya Oil | 2.5 |
| Each Stabilizer, Identified Below | 2.0 |

Test Conditions

Each plastisol formulation was drawn down to a thickness of 0.020 inches on a glass substrate which was then placed in a forced draft oven, set at 190° C., for 5 minutes to fuse, then removed to cool to ambient temperature and finally die-cut into 1"×½" "chips". The chips thus formed were placed on clean glass substrates and returned to the 190° C. oven. Samples were removed at 5 minute intervals and visually inspected for color change.
Color Scale: 1=Colorless, 3=Light Yellow, 5=Moderate Yellow, 7=Amber, 10=Black.
Ca=Calcium, Zn=Zinc, P=Phosphorus, Ba=Barium, Cd=Cadmium.

From this chart it is seen that Example 11, a stabilizer of this invention (after Example 4), performs with superior early color maintenance compared to the performance of the liquid calcium/zinc stabilizer of Example 5 which has limited application.

The product of this invention is also shown to be comparable to a liquid calcium/zinc stabilizer, Example 9, which is not considered to be non-toxic, in performance characteristics.

Example 11 also shows a product of this invention to perform comparably to the more difficult to handle, non-toxic solid and paste calcium/zinc stabilizers, Example 6, 7 and 8. From these examples the new product shows somewhat improved long term stability.

The following Examples (12 to 14) demonstrate the usefulness of a product of this invention in a flexible film formulation, such as may be used for meat-wrap purposes, compared to a typical state-of-the-art paste calcium/zinc stabilizer.

| Ingredients | Parts by Weight |
|---|---|
| BK-75 PVC (Goodyear) | 100.0 |
| Di-octyladipate | 30.0 |
| Epoxidized Soya Oil | 10.0 |
| Glyceryl Monostearate | 0.8 |
| Stabilizer | As Indicated |

Test Conditions

Each test formulation was individually pre-mixed by hand followed by intimately blending and fusing on a two-roll mill heated to 160° C. for a period of 5 minutes. After this time, the sample films were sheeted off, allowed to cool to ambient temperature, die-cut to 1"×½" chips and placed on glass substrates. The samples were then placed in a forced-draft oven at 195° C. and removed at 5 minute intervals for observance of color change.

| | | Color Development vs. Time (in Minutes) at 190° C. | | | | | | |
|---|---|---|---|---|---|---|---|---|
| Example | Stabilizer Type | 0' | 5' | 10' | 15' | 20' | 25' | 30' |
| 5 | Ca (4.2%), Zn (1.55%) Carboxylate, Liquid | 2 | 2 | 2 | 1+ | 2+ | 5 | 9 |
| 6 | Ca (0.96%), Zn (1.92%) Carboxylate, Liquid | 1 | 1 | 1+ | 4 | 7 | 9 | 10 |
| 7 | Ca (0.65%), Zn (2.3%) Carboxylate, Paste | 1 | 1 | 1+ | 3 | 5 | 10 | 10 |
| 8 | Ca (4.0%), Zn (2.3%) Carboxylate, Solid | 1 | 1 | 1 | 1+ | 4+ | 10 | 10 |
| 9 | Ca (0.4%), Zn (1.4%) Carboxylate, Liquid | 1 | 1 | 1 | 3 | 4 | 8 | 9+ |
| 10 | Ba (4.68%), Cd (2.12%) Zn (1.0%), P (1.63%) Liquid | 1+ | 1+ | 1+ | 1+ | 3+ | 4+ | 8 |
| 11 | Product of Example #4 Ca (.36%), Zn (1.34%) P (1.91%), Carboxylate, Liquid Non-Tox. | 1 | 1 | 1+ | 4 | 6 | 8 | 9 |

| | | Color Development vs. Time (in Minutes) at 195° C. | | | | | | | | |
|---|---|---|---|---|---|---|---|---|---|---|
| Example | Stabilizer | 0 | 5 | 10 | 15 | 20 | 25 | 30 | 35 | 40 |
| 12 | 1.5phr* stabilizer of Ex. 7 + 1.5phr Tris(nonylphenyl)phosphite | 1 | 1+ | 3 | 4 | 5 | 6 | 6 | 10 | 10 |
| 13 | 3.0phr stabilizer of | 1 | 1+ | 2 | 3 | 4 | 4+ | 6 | 10 | 10 |

| Example | Stabilizer | Color Development vs. Time (in Minutes) at 195° C. | | | | | | | | |
|---|---|---|---|---|---|---|---|---|---|---|
| | | 0 | 5 | 10 | 15 | 20 | 25 | 30 | 35 | 40 |
| 14 | Ex. 4 2.0phr stabilizer of Ex. 4 + 1.0phr Tris(nonylphenyl)phosphite | 1 | 2 | 3+ | 5 | 6 | 6 | 6 | 6+ | 10 |

*phr = Parts per Hundred of PVC resin.

The stabilizer composition of this invention, Example 13, is observed to hold its good early properties, i.e., prevention of degradative discoloration, longer than a state-of-the-art paste calcium/zinc stabilizer used in conjunction with added phosphite, Example 12.

Additionally, Example 4 stabilizer is shown to perform quite well at lower calcium and zinc usage and increased phosphite content, the latter added to the formulation and not blended into the liquid stabilizer itself, Example 14. Here, slightly improved long term stability is seen in comparison to state-of-the-art technology.

A product of this invention was further evaluated for its ability to retain good clarity in PVC films such as are used for meat wrap purposes. Since differences are most noticable in rolled film stock, typically of 6" to 8" diameter, the following method of evaluation was used to demonstrate this effect.

Formulations

| | A | B |
|---|---|---|
| PVC (Goodyear BK-75) | 100.0 | 100.0 |
| Di-octyladipate | 30.0 | 30.0 |
| Epoxidized Soya Oil | 10.0 | 10.0 |
| Glyceryl Monostearate | 0.8 | 0.8 |
| Stabilizer of Example 13 | 3.0 | — |
| Stabilizer of Example 12 | — | 3.0 |

Test Method

Formulations A and B were individually blended by hand, intimately mixed and fused on a two-roll mill at 165° C. for 5 minutes, sheeted off (at 0.020" thickness), cooled to ambient temperature and die-cut into 2" diameter circles. About 27 circles were placed into a ½" deep, circular-shaped steel mold and sandwiched between two highly polished chrome plated steel plates, compression molded in a hydraulic press at 165° C. at about 8500 psi (guage) pressure for 25 minutes to fuse the individual pieces into one contiguous plaque which was then cooled, while still in the press to ambient temperature. When removed from the mold, the compression molded plaques were mounted on a chart containing a grid of black and white areas in addition to type-script.

EXAMPLES 15 and 16

Visual inspection of the two plaques formed by the aforementioned method from Formulations A and B, above, showed them to be substantially different in clarity. The stabilizer of Example 13, a product of this invention, gave a plaque of near perfect clarity, whereas, the stabilizer of Example 12, a state-of-the-art product, contributed to a definite haze.

What is claimed is

1. A non-toxic liquid stabilizer comprising,
(a) from about 5 to about 35 percent of zinc resinate,
(b) from about 5 to about 35 percent of calcium resinate,
(c) from about 10 to about 40 percent of a non-toxic plasticizer,
(d) from about 1 to about 10 percent of a non-toxic antioxidant, and
(e) from about 25 to about 75 percent of a non-toxic phosphite,
said stabilizer containing from about 0.1 to about 3.5 percent zinc and from about 0.025 to about 2.28 percent calcium, all weight being based upon the total weight of the stabilizer.

2. The stabilizer of claim 1 wherein the zinc resinate is a reaction product of zinc hydroxide with a rosin acid or a reaction product of zinc chloride with a sodium or potassium salt or soap of a rosin acid; the calcium resinate is a reaction product of calcium oxide or calcium hydroxide with a rosin acid; the plasticizer is selected from the group consisting of di-2-ethylhexyladipate(dioctyladipate); di-2-ethylhexylphthalate(dioctylphthalate); dicyclohexylphthalate; diisononyladipate; diisononylphthalate; n-butyl benzyl phthalate; 1,3-butylene glycol/adipic acid polyester (1700–2200 MW) containing 16 Wt. percent terminal myristic, palmitic and stearic acid ester functionality; di($C_7$,$C_9$-alkyl) adipate, the $C_7$, $C_9$ alkyl residues being derived from oxo-process alcohols; di-n-alkyl adipate, derived from $C_6$-$C_8$-$C_{10}$ synthetic fatty alcohols; di-n-hexylazelate; di-hexylphthalate; diphenylphthalate; epoxidized butyl esters of linseed oil fatty acids; epoxidized linseed oil; epoxidized soya oil; white mineral oil; and propylene glycol adipate (3000 average molecular weight); the antioxidant is selected from the group consisting of butylated hydroxy anisole (BHA); butylated hydroxy toluene (BHT); propyl gallate; 2,4,5-trihydroxybutyrophenone; dilaurylthiodipropionate; distearyl thiodipropionate; gum guaiac; nordihydroguaietic acid; thiodipropionic acid; 2,2'-ethylidenebis (4,6-di-t-butylphenol); and the phosphite is selected from the group consisting of phosphites having the formulae

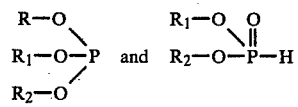

wherein $R_2$ and $R_1$ are each selected from the group consisting of aryl, alkyl, cycloalkyl, alkaryl, aralkyl, alkoxy-aryl, alkoxy-alkyl, aryloxy alkyl and alkoxy cycloalkyl radicals containing at least 5 carbon atoms and mono OH substituted variants of foregoing, R is selected from the group consisting of hydrogen and $R_1$ and $R_2$ radicals.

3. A non-toxic liquid stabilizer comprising,
(a) from about 5 to about 35 percent of zinc resinate, (b) from about 5 to about 35 percent of a calcium resinate,
(c) from about 20 to about 89 percent of a non-toxic plasticizer, and
(d) from about 1 to about 10 percent of a non-toxic antioxidant, said stabilizer containing from about 0.1 to about 3.5 percent zinc and from about 0.025 to about 2.28 percent calcium, all weights being based upon the total weight of the stabilizer.

4. The stabilizer of claim 3 wherein the zinc resinate is a reaction product of zinc hydroxide with a rosin acid or a reaction product of zinc chloride with a sodium or potassium salt or soap of a rosin acid; the calcium resinate is a reaction product of calcium oxide or calcium hydroxide with a rosin acid; the plasticizer is selected from the group consisting of di-2-ethylhexyladipate(dioctyladipate); di-2-ethylhexylphthalate (dioctylphthalate); dicyclohexylphthalate; diisononyladipate; diisononylphthalate; n-butyl benzyl phthalate; 1,3-butylene glycol/adipic acid polyester (1700-2200 MW) containing 16 Wt. percent terminal myristic, palmitic and stearic acid ester functionality; di($C_7$, $C_9$-alkyl) adipate, the $C_7$, $C_9$ alkyl residues being derived from oxo-process alcohols; di-n-alkyl adipate, derived from $C_6$-$C_8$-$C_{10}$ synthetic fatty alcohols; di-n-hexylazelate; di-hexylphthalate; diphenylphthalate; epoxidized butyl esters of linseed oil fatty acids; epoxidized linseed oil; epoxidized soya oil; white mineral oil; and propylene glycol adipate (3000 average molecular weight); and the antioxidant is selected from the group consisting of butylated hydroxy anisole (BHA); butylated hydroxytoluene (BHT); propyl gallate, 2,4,5-trihydroxybutyrophenone; dilaurylthiodipropionate; distearylthiodipropionate; gum guaiac; nordihyproguaietic acid; thiodipropionic acid; 2,2'-ethylidene bis (4,6-di-t-butylphenol).

5. A method for stabilizing a halogenated hydrocarbon resin comprising incorporating into said resin a non-toxic liquid stabilizer comprising,
(a) from about 5 to about 35 percent of zinc resinate,
(b) from about 5 to about 35 percent of calcium resinate,
(c) from about 10 to about 40 percent of a non-toxic plasticizer,
(d) from about 1 to about 10 percent of a non-toxic antioxidant, and
(e) from about 25 to about 75 percent of a non-toxic phosphite, said stabilizer containing from about 0.1 to about 3.5 percent zinc and from about 0.025 to about 2.28 percent calcium, all weights being based upon the total weight of the stabilizer, said stabilizer being incorporated in a stabilizing amount from about 0.25 to about 4.0 weight percent based upon the weight of the resin.

6. The method of claim 5 wherein the zinc resinate is a reaction product of zinc hydroxide with a rosin acid or a reaction product of zinc chloride with a sodium or potassium salt or soap of a rosin acid; the calcium resinate is a reaction product of calcium oxide or calcium hydroxide with a rosin acid; the plasticizer is selected from the group consisting of di-2-ethylhexyladipate(dioctyladipate); di-2-ethylhexylphthalate (dioctylphthalate); dicyclohexylphthalate; diisononyladipate; diisononylphthalate; n-butyl benzyl phthalate; 1,3-butylene glycol/adipic acid polyester (1700-2200 MW) containing 16 Wt. percent terminal myristic, palmitic and stearic acid ester functionality; di($C_7$,$C_9$-alkyl) adipate, the $C_7$, $C_9$ alkyl residues being derived from oxo-process alcohols; di-n-alkyl adipate, derived from $C_6$-$C_8$-$C_{10}$ synthetic fatty alcohols; di-n-hexylazelate; di-hexylphthalate; diphenylphthalate; epoxidized butyl esters of linseed oil fatty acids; epoxidized linseed oil; epoxidized soya oil; white mineral oil; and propylene glycol adipate (3000 average molecular weight); the antioxidant is selected from the group consisting of butylated hydroxyanisole (BHA); butylated hydroxytoluene (BHT); propyl gallate; 2,4,5-trihydroxybutyrophenone; distearylthiodipropionate; gum guaiac; nordihydroguaietic acid; thiodipropionic acid; 2,2'-ethylidene bis (4,6-di-t-butylphenol); and the phosphite is selected from the group consisting of phosphites having the formulae:

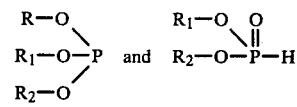

wherein $R_2$ and $R_1$ are each selected from the group consisting of aryl, alkyl, cycloalkyl, alkaryl, aralkyl, alkoxy-aryl, alkoxy-alkyl, aryloxy alkyl and alkoxy cycloalkyl radicals containing at least 5 carbon atoms and mono OH substituted variants of foregoing, R is selected from the group consisting of hydrogen and $R_1$ and $R_2$ radicals.

7. The method of claim 5 or 6 wherein the halogenated hydrocarbon resin is (1) a homopolymer of a halogenated monomer selected from the group consisting of vinyl chloride, vinylbromide, vinyl fluoride or vinylidene chloride or (2) a copolymer of one of said halogenated monomers with ethylene, propylene, butylene, vinylacetate, vinyl alcohol, vinyl ethers, methacrylates or styrene, or (3) a copolymer of vinyl chloride and vinylidene chloride.

8. A method for stabilizing a phosphite containing hydrocarbon resin comprising incorporating into said resin a non-toxic liquid stabilizer comprising,
(a) from about 5 to about 35 percent of zinc resinate,
(b) from about 5 to about 35 percent of calcium resinate,
(c) from about 20 to about 89 percent of a non-toxic plasticizer, and
(d) from about 1 to about 10 percent of a non-toxic antioxidant, said stabilizer containing from about 0.1 to about 3.5 percent zinc and from about 0.025 to about 2.28 percent calcium, all weights being based upon the total weight of the stabilizer, said stabilizer being incorporated in a stabilizing amount from about 0.25 to about 4.0 weight percent based upon the weight of the resin.

9. The method of claim 8 wherein the zinc resinate is a reaction product of zinc hydroxide with a rosin acid or a reaction product of zinc chloride with a sodium or potassium salt or soap of a rosin acid; the calcium resinate is a reaction product of calcium oxide or calcium hyroxide with a rosin acid; the plasticizer is selected from the group consisting of di-2-ethylhexyladipate(dioctyladipate); di-2-ethylhexylphthalate(dioctylphthalate); dicyclohexylphthalate; diisononyladipate; diisononylphthalate; n-butyl benzyl phthalate; 1,3-butylene glycol/adipic acid polyester (1700-2200 MW) containing 16 Wt. percent terminal myristic, palmitic and stearic acid ester functionality; di($C_7$,$C_9$-alkyl) adipate, the $C_7$, $C_9$ alkyl residues being derived from oxo-process alcohols; di-n-alkyl adipate, derived from $C_6$-$C_8$-$C_{10}$ synthetic fatty alcohols; di-n-hexylazelate; di-hexylphthalate; diphenylphthalate; epoxidized butyl esters of linseed oil fatty acids; epoxidized soya oil; epoxidized linseed oil; white mineral oil; and propylene glycol adipate (3000 average molecular weight); and the antioxidant is selected from the group consisting of butylated hydroxy anisole (BHA); butylated hydroxy toluene (BHT); propyl gallate; 2,4,5-trihydroxbutyrophenone; dilaurylthiodipropionate; distearylthiodipropionate; gum guaiac; nordihydroguaietic acid; thiodipropionic acid; 2,2'-ethylidene bis(4,6-di-t-butylphenol).

10. The method of claim 8 or 9 wherein the halogenated hydrocarbon resin is (1) a homopolymer of a halogenated monomer selected from the group consisting of vinyl chloride, vinylbromide, vinyl fluoride or vinylidene chloride or (2) a copolymer of one of said halogenated monomers with ethylene, propylene, butylene, vinylacetate, vinyl alcohol, vinyl ethers, methacrylates or styrene, or (3) a copolymer of vinyl chloride and vinylidene chloride.

* * * * *